Jan. 20, 1970 A. BOEKKOOI ET AL 3,490,890
METAL-TO-GLASS SEAL
Filed Sept. 13, 1966
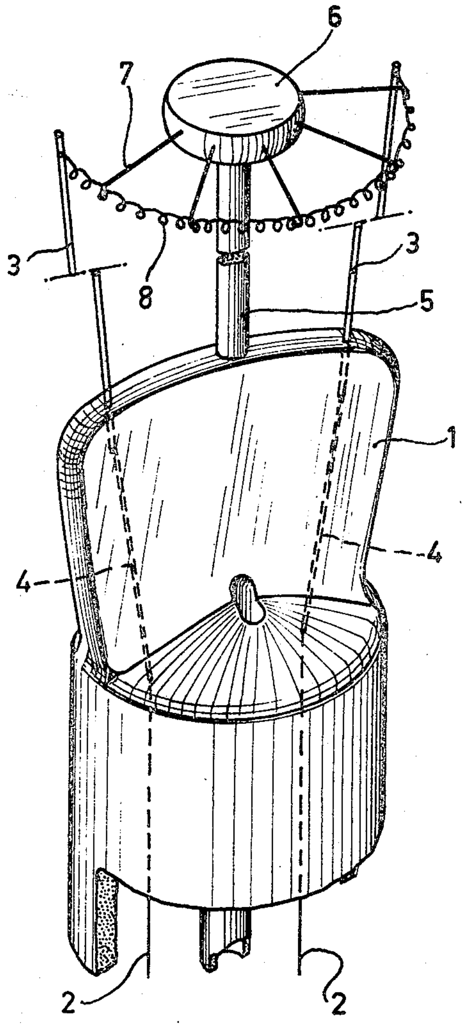
INVENTOR.
ANTON BOEKKOOI
ADRIANUS A. HURX
BY
Frank R. Trifari
AGENT

United States Patent Office 3,490,890

Patented Jan. 20, 1970

3,490,890

METAL-TO-GLASS SEAL

Anton Boekkooi and Adrianus Antonius Hurx, Emmasingel, Eindhoven, Netherlands, assignors, by mesne assignments, to U.S. Philips Corporation, New York, N.Y., a corporation of Delaware Filed Sept. 13, 1966, Ser. No. 579,131

Claims priority, application Netherlands, Sept. 17, 1965, 6512109

Int. Cl. C03c 27/04

U.S. Cl. 65—43 1 Claim

ABSTRACT OF THE DISCLOSURE

A method of sealing a metal member to a glass body in which the metal member is provided with a coating of a metal selected from the group consisting of indium, tin and zinc, which vaporizes at temperatures occurring during the sealing. The thus-coated metal member is sealed to a glass body having a thermal coefficient of expansion differing from that of the metal member.

This invention relates to metal-to-glass seals and in particular to a method of sealing metal to glass having a thermal coefficient of expansion which differs from that of the metal.

The choice of metal-glass combinations and the proportioning of the metal components to be joined to glass is very restricted. Thus, in the manufacture of vacuum-tight seals, the different thermal expansions of metals and glasses limits severely the choice of such combinations.

Even in those instances in which there are no particular requirements with respect to the vacuum tightness but only that of obtaining good mechanical connections temperature variations which occur during cooling after the seal is made, as well as in further operation, may result in a loose or cracked seal which can be very annoying. This is the case, for example, with metal components for supporting filaments in lamps which have to be secured inside the bulb to a supporting member consisting of glass and constructions such as the commonly used metal lead-in members protruding through the glass pinch in filament lamps. In the latter case the lead-in member consists of a part which can be sealed in the glass of the pinch in a vacuum-tight manner due to its thermal expansion and its proportions. The lead-in member further consists of supporting wires and current supply wires secured to this part, for example, by welding. The supporting wire and current supply wires only have to be secured to the glass mechanically so that the choice and the proportioning of them is somewhat less restricted.

The following example is illustrative of the restrictions, which may occur in practice, in the choice of material and the proportions.

The coefficient of expansion of molybdenum in the temperature range between 25 and 500° C. is $55\times10^{-7}$. Molybdenum wire, without danger of breakage or cracks, can be sealed in a soft glass of the composition 55% of $SiO_2$, 10% of NaO, 5% of $K_2O$, 30% of PbO which, between 20 and 450° C. has a coefficient of expansion of approximately $100\times10^{-7}$ up to a maximum wire thickness of 160 microns.

Sealing of thicker molybdenum wires which may be necessary, for example, if a greater mechanical rigidity or a better electric conductivity is required, is permissible only in a glass having a coefficient of expansion which differs less from that of molybdenum. For example, molybdenum wire up to a thickness of 1 mm. can be sealed without difficulty in a hard glass of the composition 67.5% of $SiO_2$, 20% of $B_2O_3$, 4.5% of $Na_2O$, 3% of $K_2O$, 5% of $Al_2O_3$, which has a coefficient of expansion of $47.5\times10^{-7}$ between 20 and 450° C.

However, if other metals, for example, tungsten, nickel and nickel iron, or glasses of compositions other than those mentioned above, are to be used in connection with their properties or price, analgous difficulties will present themselves.

It it a principal object of the invention to provide an improved metal-to-glass seal in which a larger difference in the thermal coefficient of expansion between the metal and glass can be tolerated.

A further object of the invention is to provide an improved method of joining metal to glass having a different thermal coefficient of expansion than that of the metal.

These and further objects of the invention will appear as the specification progresses.

In accordance with the invention we have unexpectedly found that if the metal components before sealing are provided with a layer of a substance which evolves vapor at the temperatures occurring during sealing an improved seal can be obtained between metal and glass of widely disparate thermal coefficients of expansion.

The following explanation of the phenomenon which occurs is offered but applicants are not bound thereby. It is assumed that a vapor layer between the metal and the glass is formed which counteracts the adhesion of the glass to the metal at an early stage so that the two materials can shrink independently from one another in a part of the cooling period as a result of which accumulation of stresses in the connection zone is counteracted.

The required layer thickness and in conjunction therewith the quantity of the metal evolving vapor depends upon the proportions of the metal components, upon the difference in expansion and shrinkage respectively between the glass and the metal, upon the temperature and the duration of the sealing, and upon the volatility of the deposited metal during sealing.

As a result of this no specific numerical limits can be stated for the application of the metal evolving vapor, but the correct amount can easily be found out experimentally for each individual case. If in a given case it appears that the stresses in the seal which, as is known can simply be observed with a polarimeter, are too large, the thickness of the layer of the metal evolving vapor can be changed.

In principle various vaporizable substances might be considered insofar as they have a sufficient vapor pressure at the temperatue of sealing, do not vapoize spontaneously, and produce no annoying reactions with the glass and the metal.

However, it has been found in practice, that as vapor evolving substances only metals are useful because they can easily be provided, for example, by electrodeposition, in the form of readily adhering layers of the required thickness and can evolve a sufficient vapor pressure during sealing and cooling.

Very good results are obtained with metals which at the temperatures required for sealing, can produce a vapor pressure of 10 to 300 mms., for example, indium, tin, and particularly, zinc. Layer thicknesses of said metals up to 30 microns, for example, 2 to 20 microns, are usually sufficient.

The invention will now be described in greater detail with reference to the accompanying drawing, the sole figure of which shows a lamp filament of normal construction which is provided with seals which can be effected advantageously according to the invention.

Two metal lead-in members which are built up from the current supply wires 2 of Monel metal and the nickel supporting wires 3 which are welded on either side of the pieces of wire 4 (copper-plated nickel iron wire having a content of 42% Mi) are sealed in the pinch 1. The pinch 1 further comprises glass supporting member 5 having a knob-like end 6 in which molybdenum wires 7 for supporting filament 8 are sealed.

The glass set is manufactured from soft glass of the above described composition (55% of $SiO_2$, 10% of $Na_2O$, 5% of $K_2O$, 30% of PbO) which has a coefficient of expansion of approximately $100 \times 10^{-7}$ between 20 and 450° C.

Molybdenum wires 7, thickness 300 microns, are sealed in the knob 6. Before sealing these wires their ends were coated by electrodeposition with a layer of zinc 2 microns in thickness. Sealing was carried out at a temperature of 700° C.

In spite of the large difference in coefficient of expansion (soft glass $100 \times 10^{-7}$, molybdenum $55 \times 10^{-7}$) no cracks occurred with the large wire thickness used, 300 microns, after cooling.

A similar result was obtained with coatings of tin and indium of 2 microns thickness instead of zinc.

As described above, the lead-in members through the pinch 1 are constructed from metals having different coefficients of expansion.

The current supply wires 2, 160 microns thickness, are manufactured from Monel metal having a coefficient of expansion of $150 \times 10^{-7}$; the supporting wires 3, 500 microns thickness are manufactured from nickel wire having a coefficient of expansion of $140 \times 10^{-7}$; and the pieces of wrapped wire 4 have a coefficient of expansion of $100 \times 10^{-7}$ and a thickness of 300 microns.

The cofficient of expansion of the wrapped wire 4 is equal to that of the soft glass used, so that a vacuum-tight seal can be manufactured without further precautions.

Zinc layers, thickness 20 microns and 5 microns respectively are provided on the ends of the wires 2 and 3 to be sealed into the glass also and consisting of metals the coefficient of expansion of which differ considerably from that of the glass.

If the whole assembly of wires is sealed in the pinch 1 at a temperature of 700° C., no cracks occur in this case also after cooling.

What is claimed is:

1. A method of forming a seal between a metal member and a glass body having a thermal coefficient of expansion differing from that of the metal member comprising the steps of providing the metal member with a coating of a metal selected from the group consisting of indium, tin and zinc which evolves metal vapor at temperatures occurring during sealing and heating the glass body to seal the thus-coated metal member to the glass body.

References Cited

UNITED STATES PATENTS

| | | | |
|---|---|---|---|
| 2,298,974 | 10/1942 | Shaw ------------ | 65—59 XR |
| 2,533,589 | 12/1950 | Kronover et al. ---- | 65—43 XR |
| 2,651,144 | 9/1953 | Foley et al -------- | 65—43 XR |

S. LEON BASHORE, Primary Examiner

S. R. FRIEDMAN, Assistant Examiner

U.S. Cl. X.R.

65—23, 59